UNITED STATES PATENT OFFICE.

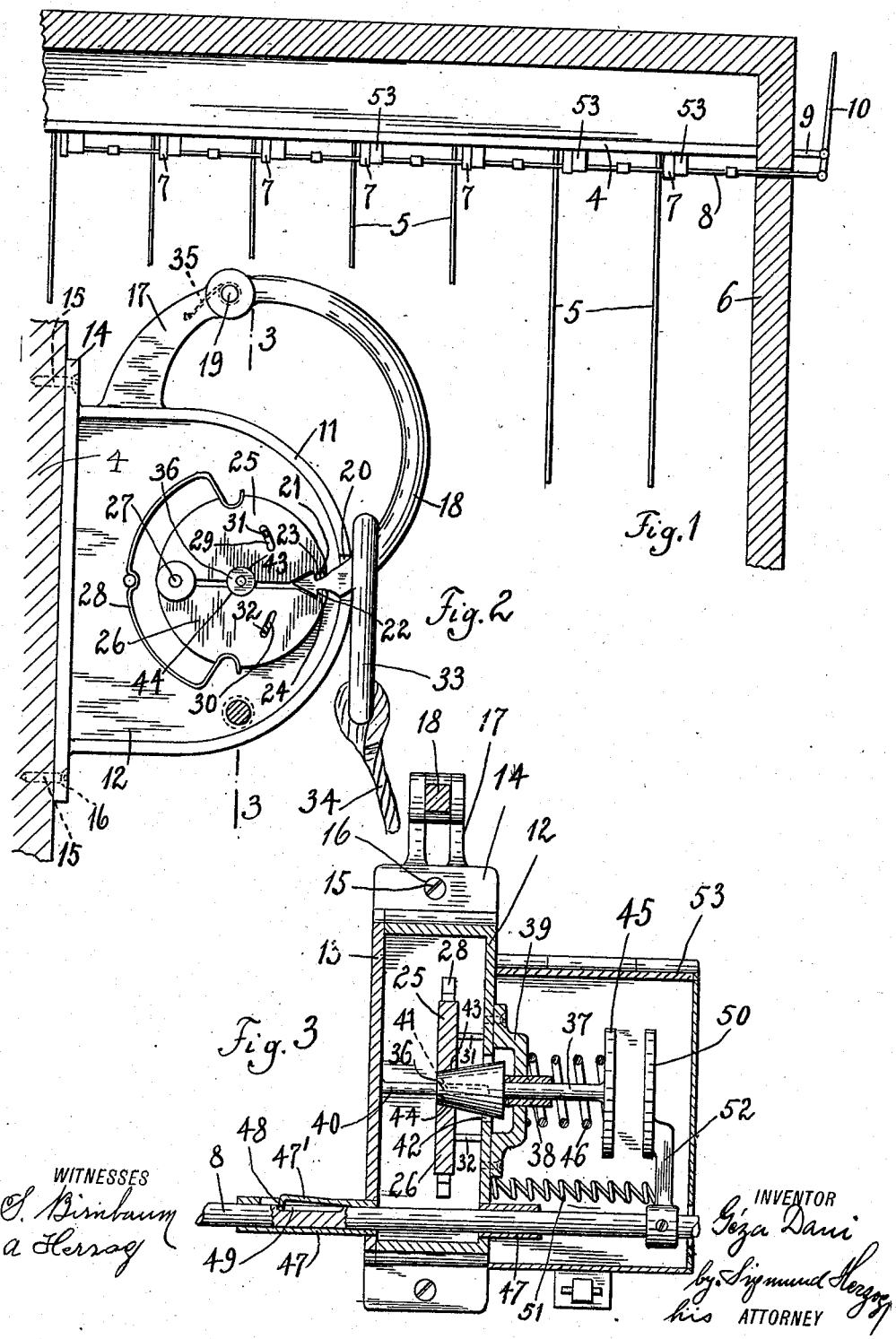

GÉZA DANI, OF NEW YORK, N. Y., ASSIGNOR OF ONE-HALF TO FERENCZ DANI, OF NEW YORK, N. Y.

LIVE-STOCK TYING AND RELEASING DEVICE.

No. 920,923.  Specification of Letters Patent.  Patented May 11, 1909.

Application filed September 25, 1908. Serial No. 454,826.

*To all whom it may concern:*

Be it known that I, GÉZA DANI, a subject of the King of Hungary, and resident of the city of New York, in the county of New York and State of New York, have invented certain new and useful Improvements in Live-Stock Tying and Releasing Devices, of which the following is a specification.

The present invention relates to a stable attachment, and more particularly to means by which horses or bovine animals are confined in their stalls and released, at will.

Horses or cattle are usually tied to the feed-trough or manger, by securing the rein or reins of the halter to a ring attachment of the feed-trough or manger. Obviously in case of danger, as for instance, in case of fire, each animal must be individually released, so that the same may be led from or may have an expeditious exit from the burning stable. It will be easily seen that often it is very difficult to have access to the stable, when burning, and the animals, being tied to the feed-trough, etc., cannot be freed therefore.

The object of the present invention is to provide a locking device, fastened to some part of the stall, as for instance, to the feed-trough, whereby each animal may be released individually, if desired, or all the animals may be freed simultaneously by suitable releasing means, leading through the wall to the stable and adapted to be operated from outside.

Other objects and advantages of the invention will be apparent from a reading of the specification and an examination of the drawings, forming part of the present application for Letters Patent.

To attain the aforementioned objects, the device consists of a plurality of locks, each of which is attached to some part of the manger and carries a shackle in engagement with a ring, to which the rein of the halter of an animal is tied; these shackles are controlled by means, running through the entire length of the stable, so as to allow of a disengagement of the said rings with the shackles. Means are furthermore provided, whereby each animal may be individually released, if desired.

The invention is illustrated in the accompanying drawings, in which—

Figure 1 is a diagrammatic plan view of a stable, provided with the attachment, forming the subject matter of the present application, Fig. 2 is a side elevation of one of the locks, the cover of the casing being removed, Fig. 3 is a section of the lock on line 3—3 of Fig. 2.

In Fig. 1, a plan view of a portion of a stable is shown, in which 4 indicates the feed-trough and 5, 5 the partitions of the stalls or compartments, in which the animals, such as horses or cattle, are confined. The walls of the stable are indicated at 6, and are made of the usual material and construction.

To some part of the stall, and more particularly in the case illustrated in the drawings, to the feeding-trough 4 are attached locks 7, 7, to which the animals are tied in a manner, hereinafter to be described. The means for releasing all the animals simultaneously comprise a rod 8, preferably made of a plurality of sections. This rod is slidably held by the locks, in a manner hereinafter to be described, and runs throughout the whole length of the stable, passing through a wall 6, to the outer side of which is attached a bracket 9, upon which is pivoted a lever 10, engaging the rod 8, whereby the same may be shifted in the direction of its longitudinal axis.

The locks are made alike, and one of the same is illustrated in Figs. 2 and 3. The casing 11 of the lock may be shaped and put together in the usual or any approved manner. More particularly, it consists of a box-like casing 12, being provided with a cover plate 13 and a flange 14, arranged substantially at right angles to the face of the cover plate 13. By means of this flange the casing is attached to the feed-trough 4 by screws 15, 15, fitting the holes 16, 16 of said flange. A bracket 17 is made integral with or fastened by suitable means to the casing 12, and carries a shackle 18, pivoted to the same at 19. This shackle protrudes through a hole 20 in the casing into the same, and is provided at its inner end with notches 21 and 22, normally in engagement with the projections 23 and 24 of the tumblers 25 and 26, respectively. The tumblers are pivoted to the casing at 27, and are kept in engagement with the shackle by means of a spring 28, arranged in the casing and engaging said tumblers. The movement of the tumblers is limited by means of slots 29 and 30, formed in the tumblers 25 and 26, respectively, and engaging pins 31 and 32, fixedly secured to the casing.

The shackle engages and holds, when locked, a ring 33, to which is tied the rein 34 of the halter of the animal. A spring 35 is secured to the bracket 17 and engages the shackle 18, and tends to swing said shackle around its pivot upward, when the inner end of the same is disengaged with the tumblers 25 and 26.

The tumblers may be actuated by means of a conical member 36, carried by a spindle 37, guided in its movement by a tubular member 38, arranged on a yoke 39, which is attached to the outer wall of the casing. A pin 40, engaging a groove 41 of the conical member 36, is carried by the cover 13 of the casing and serves to guide the inner end of the conical member. As shown in the drawings, the conical member 36 protrudes through a hole 42 of the casing into the same, and is arranged at right angles to the plane of the tumblers 25 and 26, which are provided with notches 43 and 44, respectively, in engagement with the conical member 36. The free end of the spindle 37 is provided with a disk 45, against which and the yoke 39 bears a spring 46, tending to hold the conical member 36 in its normal, that is in its outer position, whereby the projections 23 and 24 of the tumblers engage the notches 21 and 22, respectively, of the shackle. The casing is furthermore provided with a tubular member 47, projecting from both sides of the same and being arranged at right angles to the cover plate 13 of the casing and parallel with the spindle 37. This tubular member serves to guide the releasing rod 8, engaging all of the locks arranged on the manger and being prevented from turning by means of the springs 47' of the tubular member 47. These springs carry projections 48, engaging longitudinal grooves 49 in the rod 8. The rod 8 is furthermore provided with disks 50 in line with the disks 45, and kept from engagement with the same by means of the springs 51, bearing against the arms 52 of the disks 50 and the lock casings.

In order to prevent foreign matter from falling between the disks 45 and 50 of the lock and releasing rod, respectively, cover plates 53, 53 may be provided, hinged to the manger, whereby in lifting these plates access may be had to the actuating mechanism of the locks.

The operation of the device is as follows: When it is desired to release a particular animal, the disk 45 of its corresponding lock is moved toward the lock, whereby the shackles 25 and 26 are displaced by reason of the conical member 36 engaging the recesses 43 and 44 of said shackles, and thus the projections 23 and 24 of the tumblers are disengaged with the notches 21 and 22, respectively, of the shackle, which latter will thus swing upward automatically and release the ring 33 of the rein 34.

When it is desired to release simultaneously all of the animals confined in the stable, the lever 10 is moved so as to give the releasing rod 8 a longitudinal movement toward the locks, whereby the disks 50 of the same will engage the disks 45 of the locks, and thus the conical members 36 disengage the tumblers of the locks with their respective shackles. As the shackles move automatically upward by reason of the springs 35, the rings 33 are released and thus the animals freed. Obviously, the springs 51 bring the releasing rod 8 back to its normal position, and in a similar manner the springs 46 will move the disks 45 to their normal positions.

To tie an animal to its corresponding lock the ring 33 is brought in engagement with the shackle, which is then forced through the hole 20 of the casing into the lock, whereby the projections of the tumblers will engage the notches of the shackle and hold the same in its locked position.

It will be easily seen that many minor changes may be made in the construction of the parts and in the arrangement of the same without departing from the spirit and scope of the invention.

What I claim is:

The combination with a support, of a plurality of casings attached thereto, a plurality of oscillating tumblers in each casing, a swinging shackle on each casing adapted to engage the tumblers in its corresponding casing, a conical member on each casing and projecting into the same for operating said tumblers at will, a disk attached to each conical member, an operating rod, a plurality of disks corresponding in number to the number of casings on said rod and being normally disengaged from the disks on said conical members, and means adapted to shift said rod, whereby the disks thereof are brought into operative engagement with the disks of said conical members for simultaneously operating all of said conical members.

Signed at New York, in the county of New York and State of New York, this 29th day of August, A. D. 1908.

GÉZA DANI.

Witnesses:
 SIGMUND HERZOG,
 FRANK CSONKA.